(12) United States Patent
Yang et al.

(10) Patent No.: US 11,956,333 B2
(45) Date of Patent: Apr. 9, 2024

(54) METHOD FOR SHARING APPS, TERMINAL, AND STORAGE MEDIUM

(71) Applicant: BEIJING XIAOMI MOBILE SOFTWARE CO., LTD., Beijing (CN)

(72) Inventors: Huiying Yang, Beijing (CN); Zetan Pei, Beijing (CN); Zhenzhou Lu, Beijing (CN); Jiayan Li, Beijing (CN); Panpan Zhang, Beijing (CN); Linger Zhao, Beijing (CN); Wentao Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/825,263

(22) Filed: May 26, 2022

(65) Prior Publication Data
US 2023/0199086 A1    Jun. 22, 2023

(30) Foreign Application Priority Data

Dec. 21, 2021 (CN) .......................... 202111574377.4

(51) Int. Cl.
*H04L 67/60* (2022.01)
*G06F 9/451* (2018.01)
*H04L 67/00* (2022.01)
*H04L 67/06* (2022.01)

(52) U.S. Cl.
CPC .............. *H04L 67/60* (2022.05); *G06F 9/451* (2018.02); *H04L 67/06* (2013.01); *H04L 67/34* (2013.01)

(58) Field of Classification Search
CPC ......... H04L 67/60; H04L 67/06; H04L 67/34; H04L 67/131; H04L 67/125; G06F 9/451; G06F 3/0486; G06F 3/1454; G06F 9/543; G06F 3/04842; G06F 3/04847
See application file for complete search history.

(56) References Cited

U.S. PATENT DOCUMENTS

| 9,813,130 | B2* | 11/2017 | Jung ................... G06F 3/04883 |
| 10,038,719 | B2* | 7/2018 | Grosskopf .............. H04L 63/20 |
| 10,346,122 | B1* | 7/2019 | Morgan ................ G06F 3/0484 |
| 2012/0173622 | A1* | 7/2012 | Toledano ............. H04L 65/611 |
| | | | 709/204 |

(Continued)

FOREIGN PATENT DOCUMENTS

| CN | 113301506 A | 8/2021 |
| EP | 3190763 A1 | 7/2017 |
| WO | WO 2021109958 A1 | 6/2021 |

OTHER PUBLICATIONS

European Patent Application No. 22176044.0, Search and Opinion dated Dec. 2, 2022, 8 pages.

*Primary Examiner* — Javier O Guzman
(74) *Attorney, Agent, or Firm* — COZEN O'CONNOR

(57) ABSTRACT

A method and an apparatus for sharing an App, an electronic device and a storage medium are provided. The method includes in response to detecting a preset trigger operation for an App, displaying associated regions for associated devices; in response to a selecting operation for any of the associated regions, determining an associated device corresponding to the any of the associated regions as a target device; and sending interface display data of the App to the target device, so that the target device displays a program interface of the App based on the received interface display data.

20 Claims, 5 Drawing Sheets

(56) References Cited

U.S. PATENT DOCUMENTS

| | | | | |
|---|---|---|---|---|
| 2013/0304815 | A1* | 11/2013 | Puente | H04L 67/06 |
| | | | | 709/204 |
| 2014/0282207 | A1* | 9/2014 | Wouhaybi | G06F 3/0481 |
| | | | | 715/779 |
| 2014/0379811 | A1* | 12/2014 | Chan | H04W 8/24 |
| | | | | 709/205 |
| 2015/0020013 | A1* | 1/2015 | Kim | G06F 3/0488 |
| | | | | 715/769 |
| 2015/0082241 | A1* | 3/2015 | Kang | H04N 7/15 |
| | | | | 715/803 |
| 2015/0097757 | A1* | 4/2015 | Bang | G06F 3/1454 |
| | | | | 345/2.2 |
| 2015/0363066 | A1* | 12/2015 | Lemay | G06F 3/04886 |
| | | | | 345/173 |
| 2016/0088035 | A1* | 3/2016 | Yu | H04L 65/403 |
| | | | | 715/753 |
| 2016/0179456 | A1* | 6/2016 | Sivavakeesar | G06Q 10/101 |
| | | | | 715/755 |
| 2016/0197773 | A1* | 7/2016 | Pandrangi | G06F 9/44505 |
| | | | | 709/217 |
| 2016/0253142 | A1* | 9/2016 | Choi | G06F 3/1454 |
| | | | | 345/1.3 |
| 2016/0323863 | A1* | 11/2016 | Park | H04W 4/70 |
| 2017/0257403 | A1* | 9/2017 | Li | G06F 3/1454 |
| 2018/0139252 | A1* | 5/2018 | Wang | H04N 7/15 |
| 2018/0267768 | A1* | 9/2018 | Shin | G06F 3/1438 |
| 2019/0265938 | A1* | 8/2019 | Kim | H04W 12/069 |
| 2019/0361694 | A1* | 11/2019 | Gordon | G06F 1/3231 |
| 2020/0057596 | A1* | 2/2020 | Kim | G06F 3/147 |
| 2020/0379707 | A1* | 12/2020 | Kwon | G06F 3/1454 |
| 2022/0308823 | A1* | 9/2022 | Fan | G06F 3/0481 |
| 2022/0391161 | A1* | 12/2022 | Fan | G06F 3/1423 |

* cited by examiner

METHOD FOR SHARING APPS, TERMINAL, AND STORAGE MEDIUM

CROSS REFERENCE TO RELATED APPLICATIONS

This application claims priority to Chinese Patent Application No. 202111574377.4, filed on Dec. 21, 2021, the entire content of which is incorporated herein by reference.

TECHNICAL FIELD

The disclosure relates to a field of terminals, and particularly to a method and an apparatus for sharing an application (App), an electronic device and a storage medium.

BACKGROUND

With the continuous enhancement of economic strength of users and with the continuous improvement of their quality of life, most users usually have a plurality of devices. In the actual use, users usually share applications (shortened as Apps) among various devices in order to obtain a good use experience. For example, they may send a video played by a mobile phone to a tablet computer for a good viewing experience.

In the related art, when an App is shared among different devices, the same App usually needs to be installed on different devices for transmission of usage data for the users through the App, so as to realize App sharing among different devices.

SUMMARY

According to a first aspect of the disclosure, a method for sharing an App is implemented using a terminal. The method includes: in response to detecting a preset trigger operation for an App, displaying associated regions for associated devices; in response to a selecting operation for any of the associated regions, determining an associated device corresponding to the any of the associated regions as a target device; and sending interface display data of the App to the target device, so that the target device displays a program interface of the App based on the received interface display data.

According to a second aspect of the disclosure, a terminal is provided, which includes: a processor, a memory configured to store instructions executable by the processor and a screen display, configured to in response to detecting a preset trigger operation for an App, display associated regions for associated devices. The processor is further configured to in response to a selecting operation for any of the associated regions, determining an associated device corresponding to the any of the associated regions as a target device; and sending interface display data of the App to the target device, so that the target device displays a program interface of the App based on the received interface display data.

According to a third aspect of the disclosure, a non-transitory computer readable storage medium is provided, on which computer instructions are stored. When the computer instructions are executed by a processor, the above method as described in the first aspect is carried out.

BRIEF DESCRIPTION OF THE DRAWINGS

The drawings herein are incorporated into the specification and constitute a part of the specification, show embodiments in conformity with embodiments of the disclosure, and explain the principle of the disclosure together with the specification.

DETAILED DESCRIPTION

Figure 1:
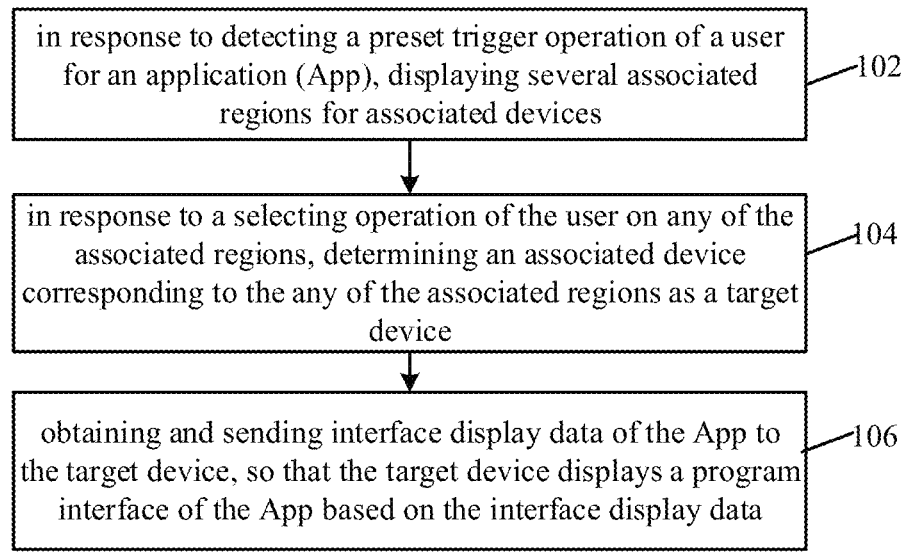
FIG. 1 illustrates a method for sharing an App according to an embodiment of the disclosure.

The embodiments may be described in detail here, examples of which are shown in the accompanying drawings. When the following descriptions refer to the accompanying drawings, unless otherwise indicated, the same numbers in different drawings represent the same or similar elements. The implementations described in the following embodiments do not represent all the implementations consistent with the disclosure. Rather, they are merely examples of the apparatus and method consistent with some aspects of the disclosure as detailed in the following claims.

The terms used in the disclosure are for the purpose of describing specific embodiments and are not intended to limit the disclosure. The singular forms "one", "said" and "the" used in the disclosure and the appended claims are also intended to include most forms, unless the context clearly indicates other meanings. It should also be understood that the term "and/or" as used herein refers to and includes any or all possible combinations of one or more associated listed items.

It should be understood that, although the terms first, second, third, etc. may be used to describe various information in the disclosure, such information should not be limited to these terms. These terms are used to distinguish the same type of information from each other. For example, without departing from the scope of the disclosure, the first information may also be referred to as the second information, and similarly, the second information may also be referred to as the first information. Depending on the context, the word "if" as used herein may be interpreted as "when . . . " or "upon . . . " or "in response to determining that . . . ".

In the related art, when an App is shared among different devices, it needs to be realized through the same App installed on the different devices. Specifically, when any one device needs to share the App installed by itself with another device, the any one device first needs to transmit usage data of a user in the App to a server of the App through the App installed by itself, and the server may share the received usage data with the same App installed by the another device. On this basis, another device may display the received usage data through the same App installed by itself.

For example, when the user needs to share a chat box being edited in a mobile phone to a tablet computer, the mobile phone first needs to transmit the content in the chat box to a server corresponding to a communication App, through the communication App to which the chat box belongs, so that the server may synchronize the received content to the same communication App installed on the tablet computer. On this basis, the tablet computer may display the above chat box in its own communication App installed based on the received content.

It is not difficult to see that in the related art, the premise of sharing an App is that different devices have the same App installed. Installing the same App in different devices not only occupies a storage space additionally, but also in the process of sharing the App, there is a large amount of usage data to be transmitted, which affects usage coherence of the users.

Therefore, the disclosure proposes a method for sharing an App, which may share an App installed on a device to another device that does not install the App, in which the another device does not need to locally install the App, thus avoiding the problem in the related art that sharing an App may be realized after the same App needs to be installed in different devices.

FIG. 1 illustrates a method for sharing an App according to an embodiment of the disclosure. As shown in FIG. 1, the method may include the following steps.

At 102, in response to detecting a preset trigger operation for an App, associated regions for associated devices are displayed.

As seen from the above introduction, when the same App in the related art needs to be installed on different devices, sharing the App may be achieved among the devices. This method for sharing the App not only occupies a storage space additionally, but also a large amount of usage data need to be transmitted for the users, which affects usage coherence that the users operate the same App on the different devices.

In this regard, the disclosure no longer realizes sharing the App among the devices with the help of the same App installed on different devices, so as to avoid the above defects of additionally occupying storage space and poor usage coherence of the users.

Specifically, the disclosure may set a preset trigger operation. When it is detected that the user performs the preset trigger operation for the App, it may be determined that the user needs to share the App. At this time, several associated regions for associated devices may be displayed, so that the user may select the device to which the App is shared. After the user selects any of the associated regions for associated devices, the associated device corresponding to any of the associated regions may be determined as a target device to be shared. On this basis, interface display data of the App may be obtained and sent to the target device, so that the target device may generate and output a program interface of the App based on the received interface display data.

It should be understood that in the disclosure, when it is detected that the user performs the preset trigger operation for the App, several associated regions for associated devices may be displayed for the user to select, which means that the preset trigger operation is bound with an App sharing function in advance, so that the user may quickly enable an App sharing interface for the App through the preset trigger operation, thus avoiding cumbersome operations of sharing the App in the related art.

In addition, after determining the target device, the disclosure transmits interface display data of the App to the target device, and the target device needs to generate and output the program interface based on the received interface display data. It may be seen that the disclosure may share the locally installed App to another device that does not install the App, in which the another device does not need to locally install the App, thus avoiding the problem that sharing the App may be realized when the same App needs to be installed in different devices in the related art.

In the disclosure, the user may use a variety of preset trigger operations to share Apps.

In an embodiment, an operation portal for the App sharing function may be displayed in a display interface of the terminal, and the preset trigger operation for the App may be an operation of moving a trigger region of the App from an original position to the operation portal. In other words, when the terminal detects that the trigger region of the App is moved from the original position to the operation portal, it may be determined that the preset trigger operation for the App is detected and the associated regions for the associated devices are displayed for the user to select.

In this embodiment, the trigger region may be any region related to the App. For example, the trigger region may be a program interface of the App, and the user may directly move the program interface to the operation portal during the operation of the program interface, so as to enable the App sharing interface of the App. It is not difficult to see that when the trigger region of the App is the program interface of the App, the user may share the currently-used App at any time during the operation of the program interface, and an operation path of sharing the App conforms to the user's operation habits (in most cases, what the user wants to share is usually the App currently in use). For another example, the trigger region may also be a program icon of the App. Then, the user needs to select any program icon from several program icons displayed, and move it to the operation portal so as to realize the sharing operation for the corresponding App. It is not difficult to see that when the trigger region of the App is the program icon, sharing the corresponding App may be realized even if the program interface of the App is not enabled.

In another embodiment, the operation portal for the App sharing function may still be displayed in the display interface of the terminal, but an App to be shared is not selected by dragging a trigger region of the App to the operation portal. In this embodiment, when a trigger operation for the operation portal is detected, several optional trigger regions of Apps to be shared may be displayed. When any of the trigger regions is triggered, it may be determined that the preset trigger operation for an App corresponding to the any of the trigger regions is detected. In other words, when the any of the trigger regions is triggered, the App to be shared corresponding to the any of the trigger regions is determined as the selected App to be shared by the user.

In yet another embodiment, the preset trigger operation may be independent of any operation portal, while a trigger operation of a preset type is taken as the preset trigger operation. For example, a trigger region of the App may be preferentially displayed. When it is detected that a trigger operation for the trigger region is of the preset type, it may be determined that the preset trigger operation corresponding to an App is detected, and the App may be regarded as the App to be shared.

In practice, it may be set in advance that the sharing for an App is initiated by a specific type of trigger operation. For example, the preset type may be a slide operation towards a preset direction, may also be a tap operation detected in the trigger region, and may also be a slide operation consistent with a preset track. This example is exemplary. The specific type of trigger operation may be set as the above preset trigger operation by those skilled in the art according to the actual needs, which is specifically not limited in the disclosure.

It should be noted that, the trigger region in this embodiment may be similar with that in the previous embodiment, i.e., which may be either the program interface of the App or the program icon of the App. The specific form of the trigger region may also be determined by those skilled in the art according to the actual needs, which is not limited in the disclosure.

At 104, in response to a selecting operation for any of the associated regions, an associated device corresponding to the any of the associated regions is determined as a target device.

In the disclosure, after detecting the preset trigger operation for the App, the associated regions of several shareable associated devices may be displayed, so that the user may select the device to which the App is shared according to his own needs.

The associated device in the disclosure refers to a device that may share Apps. The associated region of the associated device may be similar to a trigger region of the App, which may be any region related to the associated device, for example, a device icon of the associated device, a device identifier of the associated device, a device interface of the associated device, etc. The specific form of the associated region of the associated device may be determined by those skilled in the art according to the actual situations, which is not limited by the disclosure.

In practice, before displaying the associated devices, the associated device that may be used for App sharing needs to be determined. The disclosure may determine the associated device in a variety of ways.

In an embodiment, the terminal may determine a connected device that has established a data transmission channel with the terminal as the associated device of the terminal. In practice, the data transmission channel between the terminal and the associated device may be established through a network where the terminal is located, or based on short-range communication technology. For example, the network where the terminal is located may be Internet, LAN, etc. The short-range communication technology may be Bluetooth technology, NFC (near field communication), etc. The above network and short-range communication technology are exemplary, and the specific way to establish the data transmission channel may be determined by those skilled in the art according to the actual situations, which is not limited in the disclosure.

In another embodiment, the terminal may determine a device to be connected that may establish a data transmission channel with the terminal as the associated device of the terminal. In practice, the terminal may determine the device to be connected based on a network where the terminal is located. Alternatively, the terminal may also determine the device to be connected based on its own short-range communication function. The terminal may also determine the device to be connected based on its own network and short-range communication technology. Similar to the previous embodiment, the network in this embodiment may also be Internet, LAN, etc. The short-range communication function may be a Bluetooth function, a NFC function, etc. The specific network or short-range communication function for determining the device to be connected may be determined by those skilled in the art according to the actual situations, which is not limited in the disclosure.

In this embodiment, since the determined device to be connected has not established a data transmission channel with the terminal, when it is detected that the user selects any device to be connected as the target device, and a data transmission channel between the terminal and the any device to be connected needs to be established, so as to transmit the interface display data of the App to the target device through the established data transmission channel.

Both the connected device and the device to be connected may be used as the associated device of the terminal for App sharing. Therefore, in practice, the determined connected devices and devices to be connected may also be displayed to the user as the associated devices. On this basis, there may be more devices for the users to select for App sharing.

In the disclosure, the associated device of the terminal may also be determined in other ways. For example, other devices equipped with the same operating system and logged with the same system account as the terminal may be determined as the associated devices of the terminal. In this case, when the associated device of the terminal is determined, the terminal needs to obtain information of the system account logging to other device and determine whether the system account logging to the terminal is the same as the system account logging to other device. The other device may be determined as the associated device of the terminal when their system accounts are the same.

In practice, an App sharing plug-in may be built in the operating system of the terminal and the associated device in the disclosure, so that when there is a need to share an App in the terminal, the App is shared to the associated device through the App sharing plug-in with a system level.

At 106, interface display data of the App is obtained and sent to the target device, so that the target device displays a program interface of the App based on the interface display data In the disclosure, after the target device is determined, the interface display data of the program interface of the App may be obtained, and the interface display data may be sent to the target device, so that the target device may generate the program interface of the App based on the interface display data, and output the generated program interface.

It should be understood that when any device displays the program interface, the output content is essentially an image. Therefore, what the terminal obtains actually may be interface drawing data of the program interface. After the interface drawing data is sent to the target device, the target device may draw an image containing the above program interface based on the interface drawing data, and display the generated image.

In the disclosure, the user may also control the shared App through the program interface displayed in the target device. In practice, when the target device detects that the program interface output by itself is triggered, control information for the shared App may be generated based on the corresponding trigger operation, and the control information may be returned to the terminal equipped with the App. After the terminal receives the control information, interface display data for updating the program interface of the App may be generated based on the control information and may be resent to the target device, so that the target device may update the displayed program interface based on the received interface display data.

In practice, the target device may record a trigger position of the trigger operation when the trigger operation of the user is detected, so as to send the trigger position as the control information to the terminal installed with the corresponding App. On this basis, the terminal may determine an operation control on the App to be triggered by the user based on the trigger position, and generate interface display data for updating the program interface of the App based on operations corresponding to the operation control. The interface display data, as response information of the above control information, is returned to the target device, so that the target device may update the displayed program interface based on the interface display data. For example, when the interface display data is interface drawing data, an image containing the program interface may be redrawn to realize updating the program interface in the target device.

The above examples are exemplary. The specific form of the interface display data in the disclosure may be determined by those skilled in the art according to the actual situations, as long as it may be used by the target device to output the program interface of the shared App at a display level, which is not limited in the disclosure. Similarly, the specific type of control information returned by the target device in the disclosure may also be determined by those skilled in the art according to the actual situations, as long as it may be recognized by the terminal installed with the shared App and generate interface display data for updating the program interface, which is not limited in the disclosure.

It should be noted that, the terminal installed with the App and the associated device of the terminal in the disclosure may be any type of electronic device. For example, the terminal and its associated device may be mobile terminals such as smart phones and tablet computers, or may be fixed terminals such as smart TVs and PCs (personal computers). The terminal and its associated device may be the same type of electronic device or different types of electronic devices. The specific type of the terminal and its associated device in the disclosure may be determined by those skilled in the art according to the actual needs, which is not limited in the disclosure.

It may be seen from the above introduction that, the terminal in the disclosure may display the several associated regions for associated devices of the terminal when the user performs the preset trigger operation on the App, so that the user may select which device to share the App. When the selection operation for any associated region of the user is detected by the terminal, the associated device corresponding to any associated region may be determined as the target device. On this basis, the terminal may obtain the interface display data of the App and send the obtained interface display data to the target device, so that the target device may generate and display the program interface of the App based on the received interface display data.

It should be understood that, the disclosure first binds the preset trigger operation with the App sharing function in advance, so that when the preset trigger operation for the App is detected, the disclosure may quickly enable the App sharing function to share the corresponding App. In the related art, since there is still a need to enter a control panel through a setting option of the terminal, and to enter the App sharing interface through multiple selection operations, the operations of sharing Apps are more cumbersome. It may be seen that the method for sharing an App in the disclosure simplifies the operations of users when sharing the App, and avoids the problem of cumbersome operations in the related art when sharing Apps.

In addition, when sharing the App, the disclosure sends the interface display data of the App to the target device, and the target device needs to generate the program interface based on the interface display data to realize sharing the App. It should be understood that any device that may display a picture in a screen may complete the operation of generating the interface based on the interface display data. It may be seen that through the technical solution of the disclosure, even if the above App is not installed in the target device, it may also achieve that the App is shared, avoiding that the same App is installed in both devices for sharing the App in the related art.

Further, when the target device in the disclosure detects that the program interface of the shared App is triggered, control information may also be returned to the terminal installed with the App, so that the terminal may generate interface display data for updating the program interface based on the control information. After the target device receives the generated interface display data, the displayed program interface may be updated based on the interface display data. It may be seen that the disclosure may not only realize sharing the App when the App is not installed on the target device, but also realize the control operation of the App in this case.

Next, sharing an App between a smart phone and a tablet computer is taken as an example, the technical solution of the disclosure may be introduced.

Figure 2:
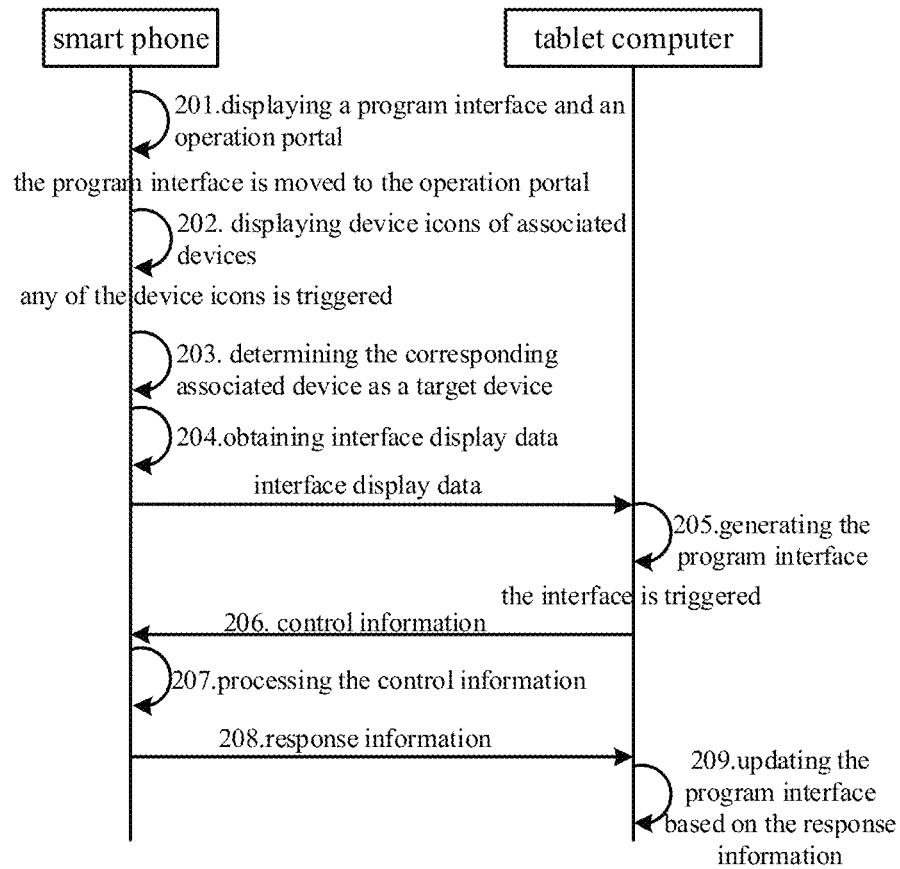
FIG. 2 illustrates an interaction diagram of a method for sharing an App according to an embodiment of the disclosure.

FIG. 2 illustrates an interaction diagram of a method for sharing an App according to an embodiment of the disclosure. As shown in FIG. 2, the method includes the following steps.

At 201, in response to detecting a program icon of an App is triggered, the smart phone displays a program interface of the App.

In this embodiment, the smart phone may be installed with several Apps. When the user unlocks the smart phone, the program icon of each App may be viewed and the corresponding App is enabled by triggering any of the program icons, so as to display a program interface of the corresponding App.

In this embodiment, "moving the program interface of the App to the operation portal" is taken as the above described preset trigger operation. Once it is detected that the currently displayed program interface is moved to the displayed operation portal, the App sharing function interface may be displayed. The function interface may include several device icons of the associated devices that have established data transmission channels with the smart phone for the user to select.

Figure 3:
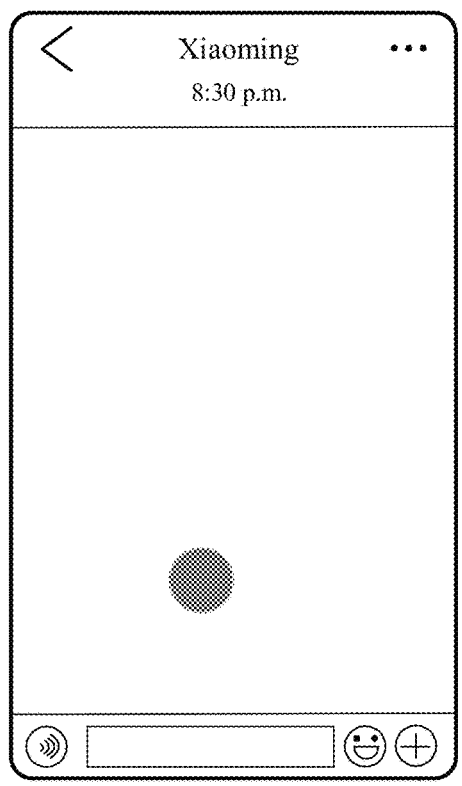
FIG. 3 illustrates a program interface diagram of an App according to an embodiment of the disclosure.
Figure 4:
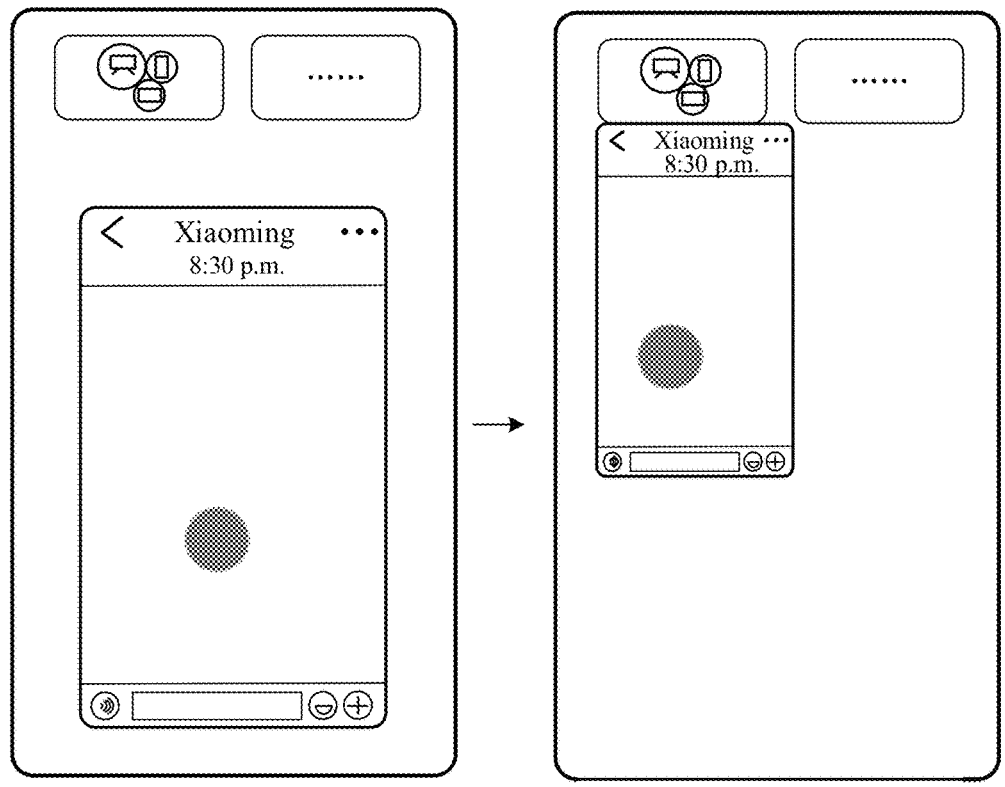
FIG. 4 illustrates a moving diagram of a program interface according to an embodiment of the disclosure.

For example, when the currently-opened App is an instant messaging App, the program interface displayed may be as shown in FIG. 3. On this basis, the user may long-press a blank region of the display interface to narrow the program interface and expose an operation portal for the App sharing function interface. At this time, the user may drag the program interface to the operation portal, as shown in FIG. 4.

At 202, in response to detecting the program interface displayed is moved to the operation portal, the smart phone displays the device icons of several associated devices.

Figure 5:
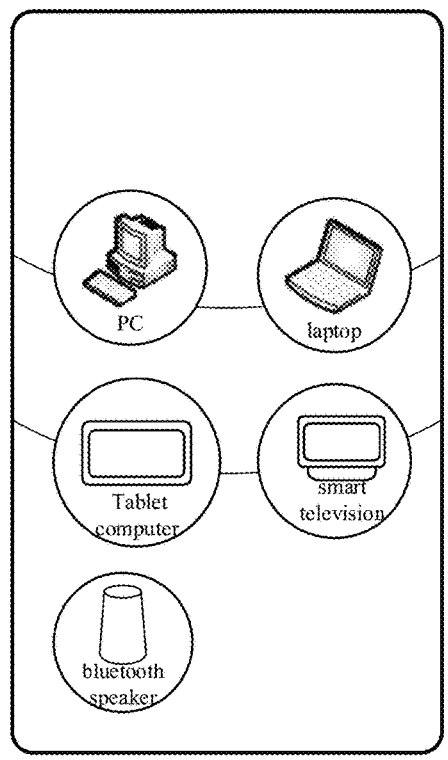
FIG. 5 illustrates a schematic diagram of an App sharing interface according to an embodiment of the disclosure.

Following the above example, after the smart phone detects that the program interface is moved to the operation portal, the device icons of several associated devices may be displayed. Further assuming that the smart phone has established a connection with a tablet computer, a smart TV, a Bluetooth speaker, a PC and a laptop through home WiFi, the App sharing interface shown in FIG. 5 may be displayed so that users may select which device to use as the target device for sharing the App.

At 203, in response to detecting the user triggers any device icon, the smart phone determines an associated device corresponding to any device icon as the target device.

Following the above example, assuming that the smart phone detects that the icon of the tablet computer is triggered, the smart phone may determine the tablet computer as the target device for sharing the instant messaging App. At this time, the smart phone may obtain and send interface display data of the instant messaging App it to the tablet computer through WiFi.

At 204, the smart phone obtains the interface display data of the App, and sends the obtained interface display data to the target device.

At 205, the tablet computer generates and displays a program interface of the App based on the received interface display data.

Figure 6A:
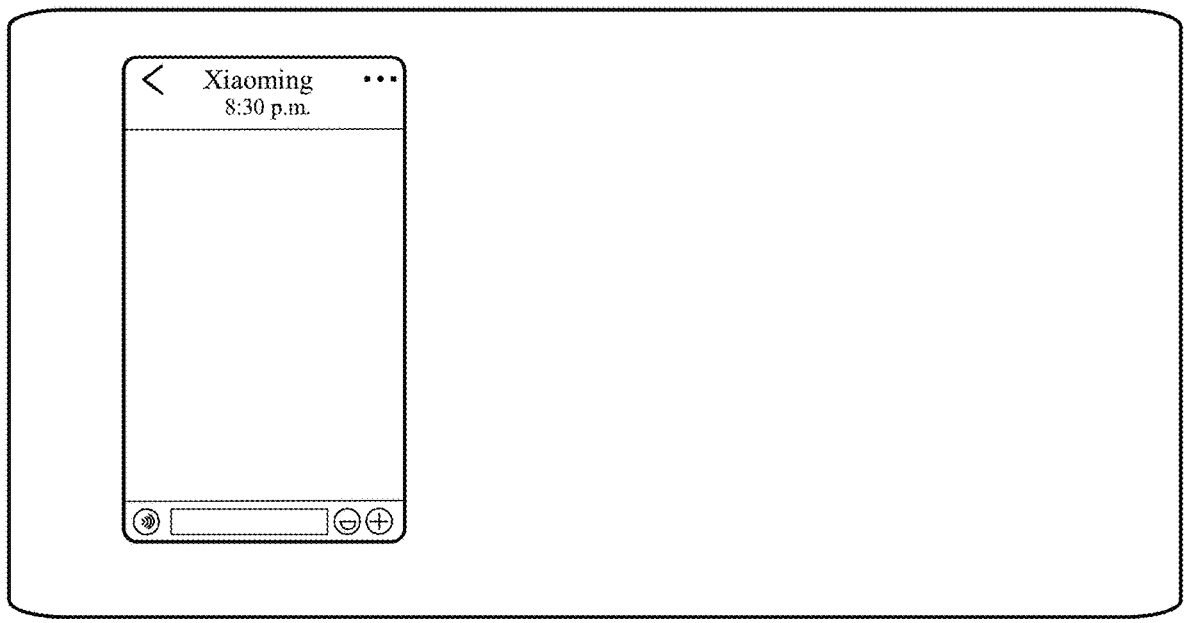
FIG. 6A illustrates a program interface diagram of a shared App according to an embodiment of the disclosure.

Following the above example, after the tablet computer receives the interface display data sent by the smart phone, the program interface of the instant messaging App may be generated based on the interface display data, and the generated program interface may be displayed in a screen of the tablet computer, as shown in FIG. 6A.

At 206, in response to detecting a trigger operation of the user for the program interface, the tablet computer returns control information to the smart phone based on the trigger operation.

Following the above example, assuming that the user needs to input content in the program interface of the instant messaging App, a text input box may be triggered in the program interface displayed on the tablet computer. Then, the tablet computer may record location information of the trigger operation in the program interface, and send the location information as the control information of the trigger operation to the smart phone, so that the smart phone may process the control information.

At 207, the smart phone processes the received control information through the App.

Figure 6B:
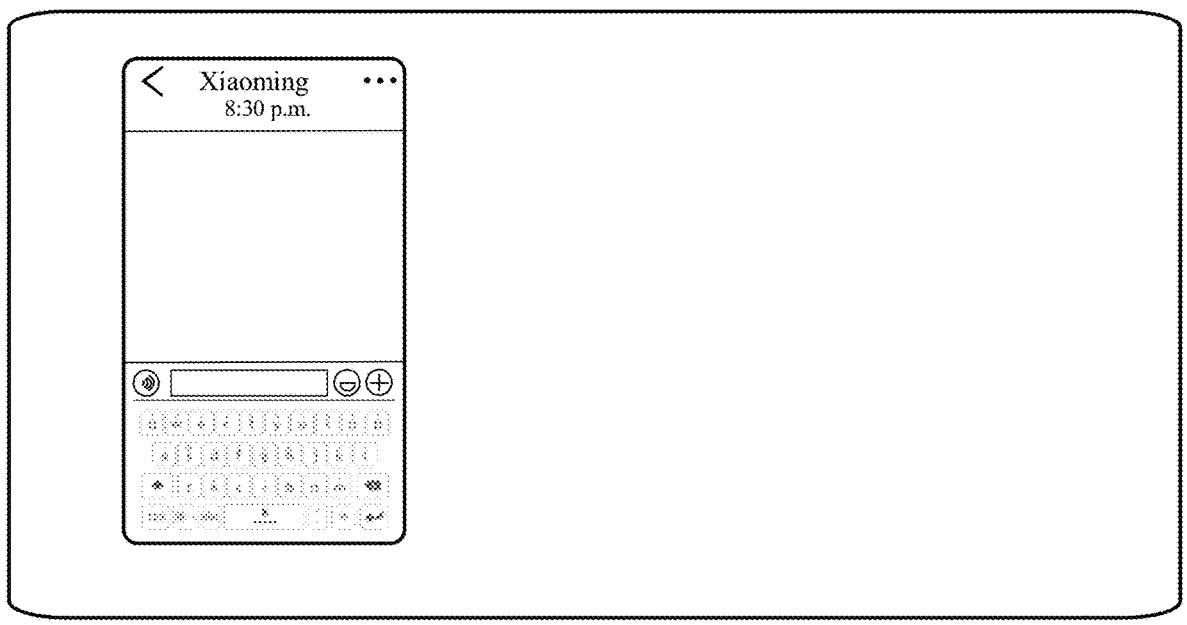
FIG. 6B illustrates a program interface diagram of another shared App according to an embodiment of the disclosure.

Following the above example, after the smart phone receives the location information of the trigger operation in the program interface, the instant messaging App may be called to determine that the control triggered by the user is a text input box based on the location information, and interface display data of the program interface containing "a keyboard opened through the text input box" is sent to the tablet computer as the processed response information, so that the tablet computer may generate a program interface containing the above keyboard based on the received interface display data, and display the updated program interface, as shown in FIG. 6B.

At 208, the smart phone returns response information to the tablet computer based on the processing result.

At 209, the tablet updates the program interface based on the response information.

It may be seen from the above technical solution that, the user may quickly open the App sharing interface by moving the program interface of the App to the operation portal. On the one hand, it avoids the problem of cumbersome operations when opening the App sharing function in the related art. On the other hand, it may enable the users to realize sharing Apps in the process of using Apps, which is more in line with user habits.

Further, the smart phone in this embodiment sends interface display data of the App to the tablet computer, so that the tablet computer may generate the corresponding program interface for display. When there is a trigger operation on the program interface displayed by the tablet computer, the control information corresponding to the trigger operation is still sent to the smart phone for processing through the App installed in the smart phone. It may be seen that this embodiment shares the App at the display level, while at the processing level, the usage data of the App is still processed through the App installed in the smart phone. This way makes the tablet computer realize sharing the App without installing the App locally, avoiding the problem that the same App needs to be installed in two devices in the related art.

Figure 7:
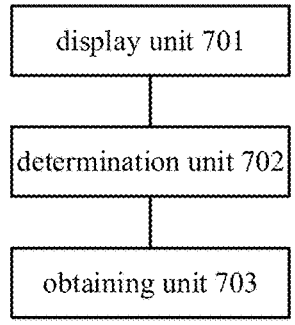
FIG. 7 illustrates a block diagram of an apparatus for sharing an App according to an embodiment of the disclosure.

FIG. 7 illustrates a block diagram of an apparatus for sharing an App according to an embodiment of the disclosure. As shown in FIG. 7, the apparatus includes a display unit 701, a determination unit 702 and an obtaining unit 703.

The display unit 701 is configured to in response to detecting a preset trigger operation of a user for an App, display several associated regions for associated devices.

The determination unit 702 is configured to in response to a selecting operation of the user for any of the associated regions, determine an associated device corresponding to the any of the associated regions as a target device.

The obtaining unit 703 is configured to obtain and send interface display data of the App to the target device, so that the target device displays a program interface of the App based on the interface display data.

Alternatively, the display unit 701 is further configured to display an operation portal for an App sharing function.

In response to detecting that a trigger region of the App is moved from an original position to the operation portal, it is determined that the preset trigger operation for the App is detected.

The trigger region includes any one of a program icon of the App and the program interface of the App.

Alternatively, an operation portal for an App sharing function is displayed in the terminal. The display unit 701 is further configured to display several trigger regions of Apps to be shared in response to a trigger operation on the operation portal. The determination unit 702 is further configured to in response to any of the trigger regions being triggered, determine that the preset trigger operation for an App corresponding to the any trigger region is detected.

Alternatively, the display unit 701 is further configured to display a trigger region of the App; the determination unit 702 is further configured to in response to detecting that a trigger operation for a trigger region is of a preset type, determine that a preset trigger operation for the App is detected. The preset type includes one of: a slide operation towards a preset direction, a tap operation detected in the trigger region, and a slide operation consistent with a preset track.

Alternatively, the determination unit 702 is further configured to determine a connected device that has established a data transmission channel with the terminal as the associated device of the terminal. The data transmission channel is established based on a network where the terminal is located or based on short-range communication technology.

Alternatively, the determination unit 702 is further configured to determine a device to be connected of the terminal based on a network where the terminal is located; and/or determine the device to be connected of the terminal based on a short-range communication function included in the terminal; and take the determined device to be connected as the associated device of the terminal.

Alternatively, the associated device includes other device equipped with the same operating system and logged with the same system account as the terminal.

Figure 8:
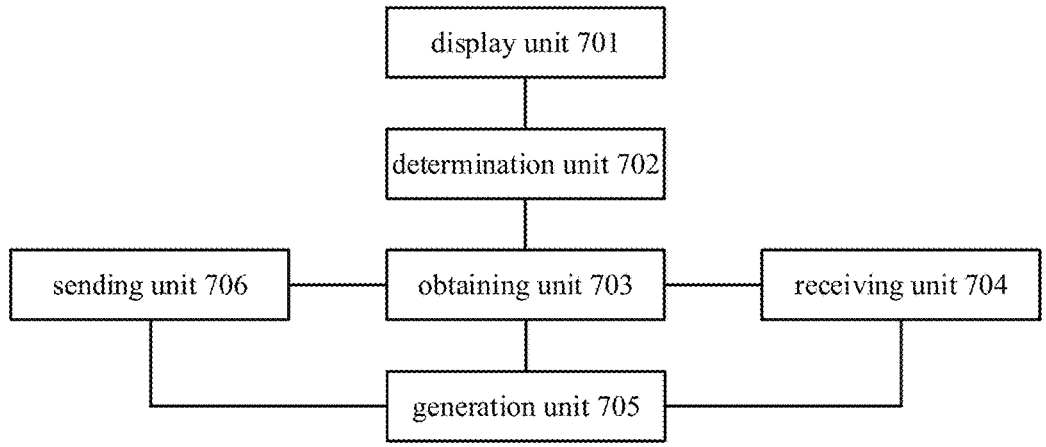
FIG. 8 illustrates a block diagram of another apparatus for sharing an App according to an embodiment of the disclosure.

As shown in FIG. 8, it is a block diagram of another apparatus for sharing an App according to an embodiment of the disclosure. In this embodiment that is based on the embodiment shown in FIG. 7, the apparatus further includes a receiving unit 704, a generation unit 705, and a sending unit 706.

The receiving unit 704 is further configured to receive control information returned by the target device. The control information is generated by the target device in response to detecting that the program interface of the App displayed is triggered.

The generation unit 705 is further configured to generate interface display data for updating the program interface of the App based on the control information.

The sending unit 706 is further configured to send the generated interface display data to the target device, so that the target device updates the program interface of the App displayed based on the received interface display data.

For the apparatus embodiment, since it basically corresponds to the method embodiment, partial description of the method embodiment for relevant parts may be referred. The apparatus embodiment described above is exemplary, in which the unit described as a separate component may be or may not be physically separated, and the component displayed as a unit may be or may not be a physical unit, that is, it may be located in one place or distributed on multiple network units. Some or all of the modules may be selected according to the actual needs to achieve the purpose of the disclosure. Those skilled in the art may understand and implement it without paying creative works.

Accordingly, the disclosure also provides a device for sharing an App, which includes a processor and a memory configured to store instructions executable by the processor. The processor is configured to implement the method for sharing an App according to any one of the above embodiments. For example, the method may include in response to detecting a preset trigger operation of a user for an App, displaying several associated regions for associated devices; in response to a selecting operation of the user for any of the associated regions, determining an associated device corresponding to the any of the associated regions as a target device; and obtaining and sending interface display data of the App to the target device, so that the target device displays a program interface of the App based on the interface display data.

Accordingly, the disclosure also provides an electronic device, which includes a memory and one or more programs. The one or more programs are stored in the memory and instructions included in the one or more programs are configured to be executed by one or more processor so that the method for sharing an App according to any one of the above embodiments is carried out. For example, the method may include in response to detecting a preset trigger operation of a user for an App, displaying several associated regions for associated devices; in response to a selecting operation of the user for any of the associated regions, determining an associated device corresponding to the any of the associated regions as a target device; and obtaining and sending interface display data of the App to the target device, so that the target device displays a program interface of the App based on the interface display data.

Figure 9:
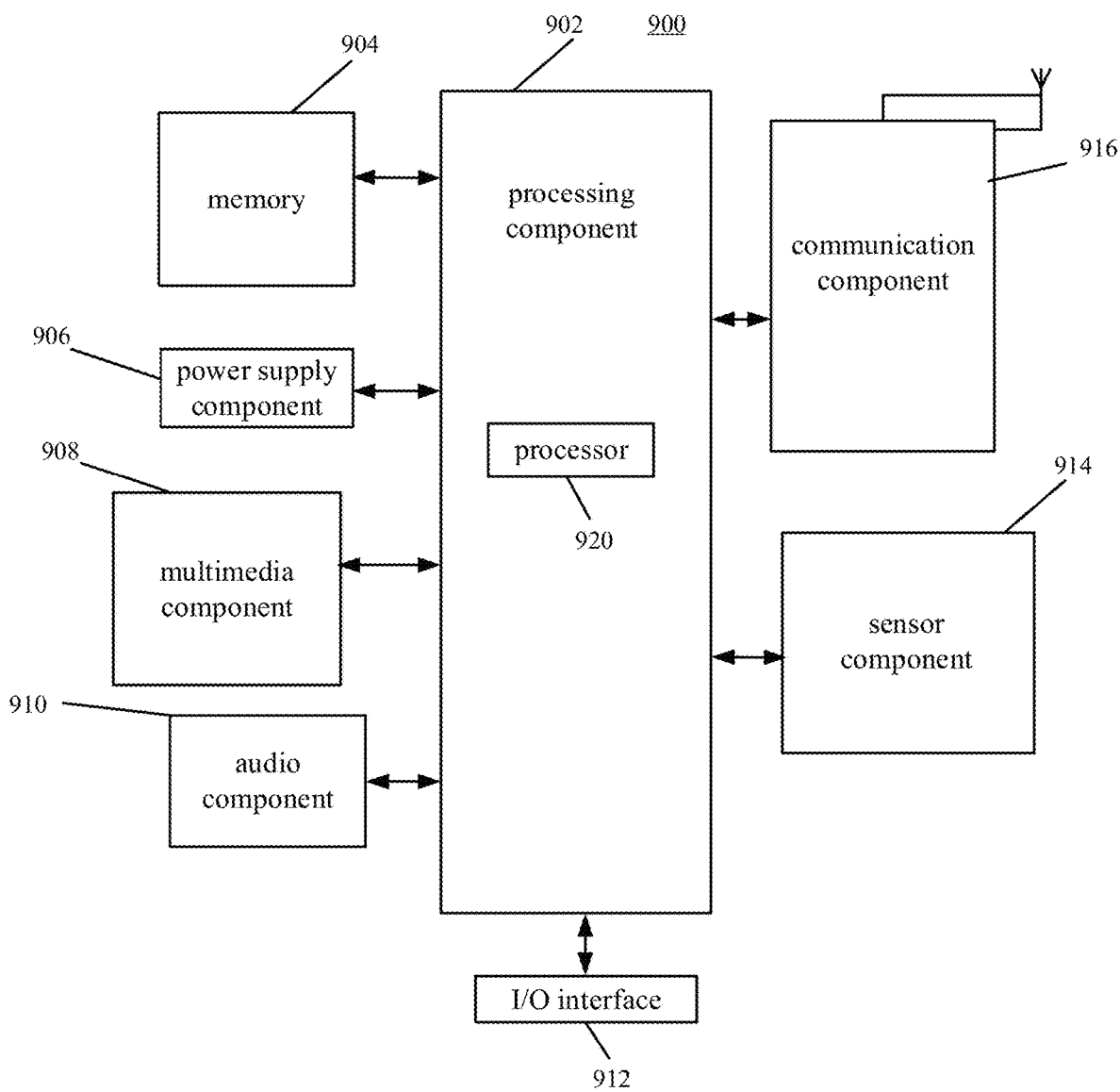
FIG. 9 is a structural diagram of an electronic device according to an embodiment of the disclosure.

FIG. 9 is a block diagram illustrating a device 900 for sharing an App according to an embodiment. For example, the device 900 may be a mobile phone, a computer, a digital broadcasting terminal, a messaging device, a game console, a tablet device, a medical equipment, a fitness equipment, a personal digital assistant, etc.

As illustrated in FIG. 9, the device 900 may include one or more components: a processing component 902, a memory 904, a power supply component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For example, the processing component 902 may include a multimedia module for the convenience of interaction between the multimedia component 908 and the processing component 902.

The memory 904 is configured to store all types of data to support the operation of the device 900. Examples of such data include instructions for any Apps or methods operated on the device 900, contact data, phonebook data, messages, pictures, video, etc. The memory 904 may be implemented using any type of volatile or non-volatile memory devices, or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 906 may provide power for all components of the device 900. The power supply component 906 may include power supply management system, one or more power supplies, and other units related to generating, managing and distributing power for the device 900.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. When the device 900 is in an operation mode, such as shooting mode or a video mode, the front camera and/or the rear camera may receive external multimedia data. Each of the front camera and the rear camera may be a fixed optical lens system or have focal length and optical zoom capability.

The audio component 910 is configured to output and/or input audio file information. For example, the audio component 910 includes a microphone (MIC) configured to receive external audio file information when the device 900 is in an operation mode, such as a call mode, a recording mode, and a voice recognition mode. The received audio file information may be further stored in the memory 904 or transmitted via the communication component 916. In some embodiments, the audio component 910 further includes a speaker to output audio file information.

The I/O interface 912 provides an interface for the processing component 902 and the peripheral interface module, and the peripheral interface module may be a keyboard, a click wheel, a button, etc. These buttons may include but are not limited to: a home button, a volume button, a start button and a lock button.

The sensor component 914 includes one or more sensors to provide status assessments of various aspects of the device 900. For example, the sensor component 914 may detect the on/off state of the device 900 and the relative positioning of the component. For example, the component is a display and a keypad of the device 900. The sensor component 914 may further detect the position change of the device 900 or a component of the device 900, a presence or absence of contact between a target object and the device 900, an orientation or acceleration/deceleration of the device 900, and the temperature change of the device 900. The sensor assembly 914 may include a proximity sensor configured to detect the presence of nearby objects without any physical contact. The sensor assembly 914 may also include a light sensor, such as a CMOS or CCD image sensor, for use in imaging Apps. In some embodiments, the sensor assembly 914 may also include an acceleration sensor, a gyroscope sensor, a magnetic sensor, a pressure sensor, or a temperature sensor.

The communication component 916 is configured to facilitate communication, wired or wirelessly, between the device 900 and other devices. The device 900 may access wireless networks based on a communication standard, such as WiFi, 2G or 3G, 4G LTE, 5G NR (New Radio) or their combination. In an embodiment, the communication component 916 receives broadcast information or broadcast associated information from an external broadcast management system via a broadcast channel. In an embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the device 900 may be implemented by one or more App specific integrated circuits (ASIC), digital signal processors (DSP), digital signal processing devices (DSPD), programmable logic devices (PLD), field programmable gate arrays (FPGA), controllers, microcontrollers, microprocessors or other electronics elements.

In an embodiment, a non-transitory computer readable storage medium including instructions is also provided, for example, a memory 904 including instructions. When the instructions may be executed by the processor 920 of the device 900, the above method is carried out. The computer-readable storage medium may be a ROM, a RAM, a CD-ROM, a magnetic tape, a floppy disc, an optical data storage device, and the like.

After considering the specification and practicing the disclosure herein, those skilled in the art will be aware of other embodiments of the present App. The disclosure aims to cover any variation, usage or adaptive change of the disclosure, which follows the general principles of the disclosure and includes the common knowledge or conventional technical means in the art not disclosed in the disclosure. The description and embodiments are considered exemplary, and the true scope of the disclosure are pointed out by the following claims.

It should be understood that the disclosure is not limited to the precise structure already described above and shown in the drawings, and various modifications and changes may be made without departing from its scope. The scope of the disclosure is limited by the appended claims.

The above are preferred embodiments of the disclosure and not intended to limit the disclosure. Any modification, equivalent replacement, improvement, etc. made within the principles of the disclosure shall be included in the protection scope of the disclosure.

What is claimed is:

1. A method for sharing an application (App), implemented using a terminal, comprising:
   displaying, in a screen display of the terminal, an operation portal for enabling an App sharing function of the terminal;
   in response to detecting that a trigger region of an App is moved from an original position to the operation portal or detecting a trigger region of an App displayed in the operation portal is triggered, displaying associated regions for associated devices in the screen display of the terminal, wherein the trigger region comprises any one of a program icon of the App and the program interface of the App, the associated device is a device that is able to share the APP with the terminal, and the associated region is one of: a device icon of the associated device, a device identifier of the associated device, or a device interface of the associated device;
   in response to detecting a selecting operation for any of the associated regions, determining an associated device corresponding to the any of the associated regions as a target device; and
   sending interface display data of the App to the target device, so that the target device displays a program interface of the App based on the received interface display data.

2. The method of claim 1, further comprising:
   in response to detecting a long press of a blank region of the program interface of the App, narrowing the program interface to expose the operation portal.

3. The method of claim 1, further comprising:
   in response to detecting a trigger operation on the operation portal, displaying trigger regions of Apps to be shared.

4. The method of claim 1, further comprising:
   displaying athe trigger region of the App;
   in response to detecting that a trigger operation for the trigger region is of a preset type, displaying the associated regions for the associated devices in the display interface of the terminal;
   the preset type comprises one of: a slide operation towards a preset direction, a tap operation detected in the trigger region, and a slide operation consistent with a preset track.

5. The method of claim 1, further comprising:
   determining a device that has established a data transmission channel with the terminal as the associated device of the terminal, wherein the data transmission channel is established based on a network where the terminal is located or based on short-range communication technology.

6. The method of claim 1, further comprising:
   at least one of determining a device to be connected of the terminal based on a network where the terminal is located, and determining the device to be connected of the terminal based on a short-range communication function included in the terminal; and, taking the device to be connected as the associated device of the terminal.

7. The method of claim 1, wherein the associated device comprises:
a device equipped with the same operating system and logged with the same system account as the terminal.

8. A terminal, comprising:
a processor; and
a memory configured to store instructions executable by the processor; and
a screen display, configured to display an operation portal for enabling an application (App) sharing function of the terminal; in response to detecting that a trigger region of an App is moved from an original position to the operation portal or detecting a trigger region of an App displayed in the operation portal is triggered, display associated regions for associated devices, wherein the trigger region comprises any one of a program icon of the App and the program interface of the App, the associated device is a device that is able to share the APP with the terminal, and the associated region is one of: a device icon of the associated device, a device identifier of the associated device, or a device interface of the associated device;
wherein the processor is configured to
in response to detecting a selecting operation for any of the associated regions, determine an associated device corresponding to the any of the associated regions as a target device; and
send interface display data of the App to the target device, so that the target device displays a program interface of the App based on the received interface display data.

9. The terminal of claim 8, wherein the processor is further configured to narrow the program interface to expose the operation portal in response to detecting a long press of a blank region of the program interface of the App.

10. The terminal of claim 8, wherein the screen display is further configured to in response to a trigger operation on the operation portal, display trigger regions of Apps to be shared.

11. The terminal of claim 8, wherein the screen display is further configured to display the trigger region of the App, and in response to detecting that a trigger operation for the trigger region is of a preset type, display the associated regions for the associated devices in the display interface of the terminal;
wherein the preset type comprises one of: a slide operation towards a preset direction, a tap operation detected in the trigger region, and a slide operation consistent with a preset track.

12. The terminal of claim 8, wherein the processor is further configured to: determine a device that has established a data transmission channel with the terminal as the associated device of the terminal, wherein the data transmission channel is established based on a network where the terminal is located or based on short-range communication technology.

13. The terminal of claim 8, wherein the processor is further configured to: at least one of determine a device to be connected of the terminal based on a network where the terminal is located, and determine the device to be connected of the terminal based on a short-range communication function included in the terminal; and, take the device to be connected as the associated device of the terminal.

14. The terminal of claim 8, wherein the associated device comprises: a device equipped with the same operating system and logged with the same system account as the terminal.

15. A non-transitory computer-readable storage medium having computer instructions stored thereon, wherein when the instructions are executed by a processor, a method for sharing an application (App) is carried out, the method comprising:
displaying, in a screen display of the terminal, an operation portal for enabling an App sharing function of the terminal;
in response to detecting that a trigger region of an App is moved from an original position to the operation portal or detecting a trigger region of an App displayed in the operation portal is triggered, displaying associated regions for associated devices in the screen display of the terminal, wherein the trigger region comprises any one of a program icon of the App and the program interface of the App, the associated device is a device that is able to share the APP with the terminal, and the associated region is one of: a device icon of the associated device, a device identifier of the associated device, or a device interface of the associated device;
in response to detecting a selecting operation for any of the associated regions, determining an associated device corresponding to the any of the associated regions as a target device; and
sending interface display data of the App to the target device, so that the target device displays a program interface of the App based on the received interface display data.

16. The storage medium of claim 15, wherein the method further comprises:
in response to detecting a long press of a blank region of the program interface of the App, narrowing the program interface to expose the operation portal.

17. The storage medium of claim 15, wherein the method further comprises:
in response to detecting a trigger operation on the operation portal, displaying trigger regions of Apps to be shared.

18. The storage medium of claim 15, wherein the method further comprises:
displaying the trigger region of the App;
in response to detecting that a trigger operation for the trigger region is of a preset type, displaying the associated regions for the associated devices in the display interface of the terminal;
the preset type comprises one of: a slide operation towards a preset direction, a tap operation detected in the trigger region, and a slide operation consistent with a preset track.

19. The method of claim 1, further comprising:
receiving control information returned by the target device, wherein the control information is generated by the target device in response to detecting a trigger operation on the displayed program interface of the App;
generating interface display data for updating the program interface of the App based on the control information; and
sending the generated interface display data to the target device, so that the target device updates the displayed program interface of the App based on the received interface display data.

20. The terminal of claim 8, wherein the processor is further configured to:
- receive control information returned by the target device, wherein the control information is generated by the target device in response to detecting a trigger operation on the displayed program interface of the App;
- generate interface display data for updating the program interface of the App based on the control information; and
- send the generated interface display data to the target device, so that the target device updates the displayed program interface of the App based on the received interface display data.

\* \* \* \* \*